(12) United States Patent
Lee et al.

(10) Patent No.: US 11,452,307 B2
(45) Date of Patent: Sep. 27, 2022

(54) METHOD FOR PREPARING POROUS RED GINSENG

(71) Applicant: Wellness Korea Co., Ltd., Seoul (KR)

(72) Inventors: Joung Kyu Lee, Seoul (KR); Young Chui Jung, Seoul (KR)

(73) Assignee: Wellness Korea Co., Ltd., Seoul (KR)

( * ) Notice: Subject to any disclaimer, the term of this patent is extended or adjusted under 35 U.S.C. 154(b) by 645 days.

(21) Appl. No.: 16/328,661

(22) PCT Filed: Aug. 1, 2017

(86) PCT No.: PCT/KR2017/008302
§ 371 (c)(1),
(2) Date: Feb. 26, 2019

(87) PCT Pub. No.: WO2018/043928
PCT Pub. Date: Mar. 8, 2018

(65) Prior Publication Data
US 2021/0289823 A1 Sep. 23, 2021

(30) Foreign Application Priority Data

Aug. 30, 2016 (KR) .................. 10-2016-0110499
Aug. 1, 2017 (KR) .................. 10-2017-0097260

(51) Int. Cl.
*A23L 19/10* (2016.01)
*A23L 5/10* (2016.01)
(Continued)

(52) U.S. Cl.
CPC ............... *A23L 19/10* (2016.08); *A23L 3/365* (2013.01); *A23L 3/40* (2013.01); *A23L 5/13* (2016.08);
(Continued)

(58) Field of Classification Search
CPC . A23L 19/10; A23L 5/13; A23L 3/365; A23L 3/40; A23L 5/10; A23L 33/00;
(Continued)

(56) References Cited

U.S. PATENT DOCUMENTS 2,899,319 A * 8/1959 Powers .................. A23B 7/024
426/270
3,033,690 A * 5/1962 Tarvin .................... A23B 7/024
34/287
(Continued)

FOREIGN PATENT DOCUMENTS

CN 1613361 A * 5/2005
CN 101278956 A * 10/2008
(Continued)

OTHER PUBLICATIONS

ISA/KR, International Search Report for PCT/KR2017/008302 (dated Nov. 10, 2017).
(Continued)

*Primary Examiner* — Drew E Becker
(74) *Attorney, Agent, or Firm* — Fish & Richardson P.C.

(57) ABSTRACT

The present invention relates to a method for manufacturing a porous red ginseng. The porous red ginseng according to the present invention forms a uniform porosity therein and thus obtains a crispy mouthfeel and an excellent flavor without an additional process such as an addition of fructose, etc., such that the resulting red ginseng may be not only directly eaten as an original form or slices of the red ginseng, but also have a very high content of ginsenoside and a low content of moisture therein, thus achieving a very excellent storage quality.

6 Claims, 5 Drawing Sheets

(51) Int. Cl.
*A23L 3/365* (2006.01)
*A23L 3/40* (2006.01)

(52) U.S. Cl.
CPC ... *A23V 2002/00* (2013.01); *A23V 2250/2124* (2013.01); *A23V 2300/10* (2013.01); *A23V 2300/20* (2013.01); *A23V 2300/24* (2013.01)

(58) Field of Classification Search
CPC ..... A23L 3/36; A23L 3/44; A23L 3/52; A23V 2002/00; A23V 2250/2124; A23V 2300/38; A23V 2300/20; A23V 2300/24; A23V 2300/10; A23B 7/005–7/0053; A23B 7/021; A23B 7/024; A23B 7/04; A23B 7/0441; A23B 7/045
See application file for complete search history.

(56) References Cited

U.S. PATENT DOCUMENTS

| | | | | |
|---|---|---|---|---|
| 3,395,022 | A * | 7/1968 | Vollink | A23B 7/024 426/620 |
| 4,346,522 | A * | 8/1982 | Nakagaki | A23B 7/02 426/465 |
| 4,446,130 | A * | 5/1984 | Hachiya | A61K 36/258 424/728 |
| 4,647,469 | A * | 3/1987 | Jakobsson | A23B 7/06 426/524 |
| 2005/0220903 | A1 * | 10/2005 | Lee | A61K 36/258 424/728 |
| 2007/0224297 | A1 * | 9/2007 | Park | A61Q 19/08 424/74 |
| 2017/0303553 | A1 * | 10/2017 | Lagares-Gamero | F26B 15/06 |
| 2019/0038691 | A1 * | 2/2019 | Lee | A61K 31/702 |

FOREIGN PATENT DOCUMENTS

| | | | |
|---|---|---|---|
| CN | 104257710 A | * | 1/2015 |
| CN | 105147750 A | * | 12/2015 |
| KR | 10-1998-0026292 | | 7/1998 |
| KR | 10-2004-0081932 | | 9/2004 |
| KR | 10-2005-0102787 | | 10/2005 |
| KR | 10-2005-0102787 A | | 10/2005 |
| KR | 10-0549623 | | 2/2006 |
| KR | 10-0596451 | | 6/2006 |
| KR | 10-0596451 | | 7/2006 |
| KR | 10-0779257 | | 11/2007 |
| KR | 10-2011-0108718 | | 10/2011 |
| KR | 10-2013-0049649 | | 5/2013 |
| KR | 10-2013-0049650 | | 5/2013 |
| KR | 20150077633 A | * | 7/2015 |
| KR | 10-2015-0113624 | | 10/2015 |
| KR | 20150113624 | * | 10/2015 |
| KR | 20150113624 A | * | 10/2015 |
| KR | 10-1619410 B1 | | 5/2016 |
| WO | WO 2018/043928 | | 3/2018 |

OTHER PUBLICATIONS

Office Action in Korean Appln. No. 10-2017-0097260, dated Jun. 14, 2018, 8 pages (with English Translation).
Grant of Patent in Korean Appln. No. 10-2017-0097260, dated Mar. 23, 2020, 3 pages (with English Translation).

* cited by examiner

| Classification | Drying Method | Presence of Freezing and Thawing | Cross Section |
|---|---|---|---|
| Example 1 | Vacuum drying | Freezing |  |
| Example 3 | Vacuum drying | Thawing after freezing |  |
| Example 5 | Ambient pressure drying | Freezing |  |
| Example 6 | Vacuum drying | Cutting in a thickness of 3 mm after thawing |  |
| Comparative Example 1 | Vacuum drying | No-freezing |  |

Fig. 3.

| Classification | Drying method | Cross Section |
|---|---|---|
| After freeze-drying (present invention) | Vacuum-drying (Example 1) | |
| | Ambient pressure drying (Example 5) | |
| Freeze-drying | Freeze-drying (Comparative Example 2) | |
| Conventional drying | Ambient-pressure drying (Comparative Example 3) | |

METHOD FOR PREPARING POROUS RED GINSENG

CROSS-REFERENCE TO RELATED APPLICATIONS

This application is a U.S. National Phase application under 35 U.S.C. § 371 of International Patent Application No. PCT/KR2017/008302, filed Aug. 1, 2017, which claims priority to Korean Patent Application No. 10-2017-0097260, filed Jul. 31, 2017 and Korean Patent Application No. 10-2016-0110499, filed Aug. 30, 2016. The contents of the parent applications are hereby incorporated by reference in their entirety.

TECHNICAL FIELD

The present invention relates to a method for manufacturing a porous red ginseng, and more particularly, to a method for manufacturing a porous red ginseng, wherein a steamed ginseng is completely frozen and then dried to form a uniform porosity therein and obtain a crispy mouthfeel and an excellent flavor without an additional process such as an addition of fructose, etc., such that a resulting red ginseng may be not only directly eaten as an original form or slices of the red ginseng, but also have a very high content of ginsenoside and a low content of moisture therein, thus achieving a very excellent storage quality.

BACKGROUND

Ginseng (*Panax* ginseng C. A. Meyer. Ginseng radix) is a perennial herbal plant, which belongs to the *Panax* genus of the Araliaceae plant family, wherein the ginseng has been used for medicinal purposes in oriental medicine from a long time ago. In modern times, the ginseng has been regarded as one of the most excellent health foods in the world due to its various pharmacological actions such as a tonic and invigorating action, an anti-cancer action, etc.

As an example of representative ginseng species, there are Korean ginseng (*Panax* ginseng C. A. Meyer), which grows wild in the Far East regions of Asia (33 to 48° north latitude: Korea, North Manchuria and a part of Russia) and has a very excellent medicinal effect; American ginseng (*Panax* quinquefolium L.), which is grown and grows wild in America and Canada; Chinese ginseng (*Panax* notoginseng F. H. Chen), which is grown or grows without cultivation in regions ranging from the southeast part of Yunnan Sheng to the southwest part of Guang Xi Sheng in China; Japanese ginseng (*Panax* japonicus C. A. Meyer), which is distributed in regions ranging from Japan, the southwest part of China to Nepal; and the like.

As an active component of the ginseng, ginseng saponin is known and classified into protopanaxadiol (PPD) based saponin; protopanaxatriol (PPT) based saponin; and oleanane based saponin according to a structure of aglycon. Out of those saponins, PPD and PPT-based ones are unique to the ginseng and known to have a strong efficacy such as strengthening of immunity, an anti-cancer effect, etc. It is reported that such chemical components of the ginseng have respective efficacies, but a combination of those several components also show a remarkably excellent efficacy for a certain medicinal purpose.

On the other hand, a novel component, which is not present in the ginseng, is produced according to a method for processing the ginseng. It is also possible to develop a novel processed ginseng, which shows a more excellent effect on various biological activities including an antioxidant action compared to the ginseng.

In particular, as the one frequently used according to the novel method for processing the ginseng as above, there may be a red ginseng. The red ginseng is named as such because an outer skin of a fresh ginseng turns red while going through a process of steaming the fresh ginseng for two to three hours and then drying the resulting steamed ginseng, that is, a refining process, in which starch of the fresh ginseng is gelatinized, for the purpose of storing the fresh ginseng for a long period of time. Accordingly, the red ginseng produces a unique component maltol, which is not found in the fresh ginseng. Also, a fermented red ginseng is a processed ginseng, in which a certain component is strengthened by means of a fermentation using a microorganism and enzyme, wherein the fermented red ginseng is also known to help strengthen immunity, and thus many products thereof have been released on the market.

In general, a method for manufacturing the red ginseng includes washing of a fresh ginseng, steaming (90° C. to 100° C.), a first drying (35% to 40% moisture), a second drying (around 16% moisture), trimming, etc. If the fresh ginseng is made into the red ginseng, the resulting red ginseng is accompanied by physicochemical changes such as an increase in storage quality, conversion of saponin, change of amino acid, browning phenomenon, etc.

However, in the method for manufacturing the red ginseng, properties of the red ginseng vary depending on a difference in the manufacturing method above. For example, if a drying speed is too fast in a drying process, an aging phenomenon occurs to an outer surface of the ginseng only to form an outer shape of the red ginseng first and then to dry an inside thereof, such that there is a remarkable increase in a crack phenomenon or an occurrence of inside cavity, which is the greatest defective factor in manufacturing the red ginseng. In case of failing to meet an appropriate temperature and humidity, at which browning takes place, an inside white phenomenon may occur. Also, if drying is not done properly, there occurs a difference of moisture content between the inside and the outside of the red ginseng, and thus the inside cavity, inside white and white skin may occur to an internal tissue of the red ginseng.

To solve the drawbacks of the red ginseng as above, so far there has been a research to enhance a quality of the red ginseng, which is obtained by steaming the fresh ginseng, and to increase a processing efficiency thereof, and now there has been an ongoing research to process the red ginseng for a high quality and reduce a rate of defects during processing.

For example, as the method for manufacturing the red ginseng, the Public Patent Notification No. 10-2005-0102787 discloses a content on the method for manufacturing the red ginseng, which increases a rate of producing a high-grade red ginseng without having the inside cavity, inside white and white skin in an internal tissue of the red ginseng, wherein the method comprises: a step of steaming a ginseng according to a conventional method; a first drying step of drying the resulting steamed ginseng at a fixed temperature while maintaining a certain temperature within a range of 55° C. to 60° C. for about 15 hours; and a second drying step of drying the resulting dried ginseng until a moisture content reaches 13% to 15% by means of drying under sunlight or at a fixed temperature of 55° C., and the Patent Registration Notification No. 10-0596451 discloses a content on the method for manufacturing the red ginseng, which includes processes of steaming a ginseng firstly;

steaming the first steamed ginseng secondly again; ripening the resulting steamed ginseng in a far-infrared divergence environment; and freeze-drying the resulting ripen ginseng.

The methods for manufacturing the red ginseng disclosed above are to improve a traditional method for manufacturing the red ginseng, wherein the objective of the inventions above is to manufacture the red ginseng according to the said methods, which improves a content of components contained in the red ginseng, while having no big difference of appearance from the red ginseng manufactured by means of the traditional processing method, reducing a rate of defects with improvement in a processing process, and preventing an occurrence of the inside cavity, inside white and white skin in an internal tissue of the red ginseng.

A drawback of the red ginseng manufactured according to a general process of manufacturing the red ginseng as above is that the manufactured red ginseng itself may not be eaten as it is. In other words, the red ginseng processed by means of a general traditional method has a problem in that a tissue thereof is too dense and solid to eat directly. Now, according to the only processing method for making an intake of the red ginseng easy, there is provided only the slice of sweetened red ginseng, which is obtained by softening solid tissues by means of an addition of fructose, etc. and heating, wherein products using an extracted concentrate of such slice take up the most of products released on the market. In other words, it is estimated that the red ginseng was manufactured for the first time in Goryo Dynasty, about 1,000 years ago. Since then, however, no other appropriate type of the red ginseng has been manufactured even until now, in such a way that the red ginseng may be directly eaten without an additional process such as sugaring, extraction or the like.

Against these backdrops, the present inventors have made every effort to develop a method for processing the red ginseng, wherein the red ginseng may be directly eaten as an original form or slices of the red ginseng without an additional process such as sugaring using sugars such as fructose, etc., extraction or the like, and thus established the method for manufacturing the porous red ginseng, which has a high content of ginsenoside and gives a remarkably excellent mouthfeel during a direct intake, thereby completing the present invention.

PRIOR ART REFERENCES

Patent Documents

Korean Public Patent Notification No. 10-2005-0102787
Korean Public Patent Notification No. 10-0596451

DETAILED DESCRIPTION OF THE INVENTION

Technical Problem

The objective of the present invention is to provide a method for manufacturing a porous red ginseng, which forms a uniform porosity and thus may be not only directly eaten as an original form or slices of the red ginseng, but also have a very high content of ginsenoside without an additional process such as an addition of fructose, etc. in order to improve a solid tissue of the red ginseng manufactured by means of a traditional method.

Technical Solution

The present inventors have made every effort to reduce a hardness of solid tissue of a red ginseng, and thus identified that a porous tissue is uniformly formed in the red ginseng and thus a hardness of the tissue is reduced, if a steamed ginseng is slowly and completely frozen and the resulting frozen ginseng is dried, thereby completing the present invention.

The present invention relates to a method for manufacturing a porous red ginseng, wherein the method comprises: (a) a steaming step of steaming a fresh ginseng under the condition of hot water or hot water steam at 95° C. to 105° C. for 90 minutes to 150 minutes;
(b) a freezing step of freezing the said steamed fresh ginseng at −25° C. to −3° C. for 72 hours to 120 hours; and
(c) a drying step of vacuum-drying the said frozen ginseng in a frozen or thawed state at 75° C. to 95° C. for 10 hours to 48 hours or ambient-pressure drying the same at 50° C. to 65° C. for 24 hours to 48 hours by adjusting a temperature of hot water surrounding a vacuum dryer,
and characterized in that the thawing of the said step (c) is performed while thin ice is kept inside the frozen ginseng.

The porous red ginseng manufactured by means of the method for manufacturing the porous red ginseng according to the present invention forms a uniform porosity therein and thus obtains a crispy mouthfeel and an excellent flavor without an additional process such as an addition of fructose, etc., such that the resulting red ginseng may be not only directly eaten as an original form or slices of the red ginseng, but also have a very high content of ginsenoside and a low content of moisture therein, thus achieving a very excellent storage quality.

Figure 1:
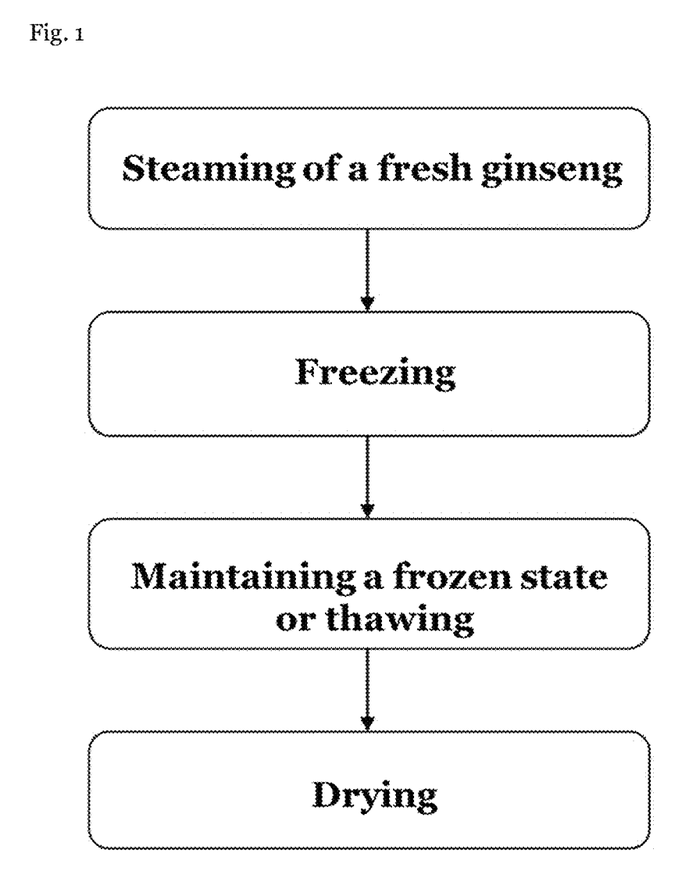
FIG. 1 is a flow chart of showing a manufacturing process in a method for manufacturing a porous red ginseng according to the present invention.

A flow chart of the method for manufacturing the porous red ginseng according to the present invention is shown in FIG. 1. As shown in FIG. 1, the method for manufacturing the porous red ginseng according to the present invention is to manufacture the porous red ginseng according to present invention by: (a) steaming a fresh ginseng; (b) freezing the steamed fresh ginseng; and (c) drying the frozen fresh ginseng in a frozen state or a thawed state thereof.

The method for manufacturing the porous red ginseng according to the present invention comprises (a) a steaming step of steaming a fresh ginseng under the condition of hot water or hot water steam at 95° C. to 105° C. for 90 minutes to 150 minutes.

The "fresh ginseng" of the present invention means the ginseng, which is not processed after being harvested from a field (moisture content of 70% to 80%), and the "red ginseng" refers to a first processed product of the fresh ginseng, which takes on a red color by steaming the fresh ginseng or gelatinizing starch thereof by means of other methods, and drying the resulting ginseng for the purpose of storing the fresh ginseng for a long period of time.

In the present invention, "porosity" means a state of having many small cracks inside a solid. If the uniform porosity is formed in the red ginseng, such porosity may provide a crispy mouthfeel of the red ginseng.

According to the present invention, (a) the steaming step of steaming the fresh ginseng refers to the steaming by means of a process of supplying hot water or hot water steam when manufacturing the red ginseng. Particularly, such steaming may be performed by putting the fresh ginseng into a ginseng steamer, then raising a temperature step by step for 60 minutes to 90 minutes until the temperature reaches 90° C. to 95° C. from 40° C. to 50° C., and then treating with hot water at 90° C. to 110° C. for 30 minutes to 36 hours, preferably at 95° C. to 105° C. for 90 minutes to 150 minutes, or treating with hot water steam under the same condition as above. A steaming time in the step of steaming above may be appropriately adjusted by those skilled in the art according to a size of the fresh ginseng, a state thereof, etc.

Through the said step of steaming the fresh ginseng, a novel component, which is not present in the fresh ginseng, may be produced and the resulting red ginseng may further contain components, which show a more excellent effect on various biological activities including an antioxidant action compared to the ginseng.

The method for manufacturing the porous red ginseng according to the present invention comprises (b) a freezing step of freezing the said steamed fresh ginseng at −25° C. to −3° C. for 72 hours to 120 hours.

The freezing step of freezing the said steamed fresh ginseng according to the present invention provides a first pre-treatment procedure to secure porosity by freezing the steamed fresh ginseng at −25° C. to −3° C. If a freezing temperature for the steamed ginseng in the said manufacturing step is less than −25° C., there is a problem in that tissues of the steamed ginseng are frozen as they are without forming ice between the tissues due to a quick freezing, and thus a uniform porosity is not formed therein. If such temperature is more than −3° C. above, there is a problem in that only a surface of the steamed fresh ginseng is frozen or tissues inside such ginseng are not almost frozen and ice is not formed between the tissues, such that a uniform porosity is not formed and the tissues become hard, thus making it difficult to manufacture the porous red ginseng.

In the present invention, a freezing temperature and a freezing time may vary depending on a size of the steamed ginseng, a state thereof, an amount of loading or the like. Such temperature and time are adjusted in such a way that the steamed ginseng may be slowly frozen to reach a completely frozen state, and thus the resulting red ginseng may secure an appropriate porosity.

The method for manufacturing the porous red ginseng according to the present invention comprises (c) a drying step of vacuum-drying the said frozen ginseng in a frozen or thawed state at 75° C. to 95° C. for 10 hours to 48 hours or ambient-pressure drying the same at 50° C. to 65° C. for 24 hours to 48 hours by adjusting a temperature of hot water surrounding a vacuum dryer.

(c) The drying step of drying the said frozen ginseng according to the present invention in a frozen or thawed state provides a drying condition such that porous characteristics may be maintained in the resulting red ginseng while removing moisture from the inside thereof to secure porosity. In case of the dried ginseng, a material temperature of the steamed ginseng (temperature of the ginseng) is lower than a drying temperature and does not exceed 65° C. due to evaporation of moisture contained in the steamed ginseng. Thus, the frozen steamed ginseng may be dried at a low temperature, thus minimizing a thermal denaturalization of nutritive components (e.g., ginsenoside) contained in the ginseng. Accordingly, there is provided the red ginseng, which is manufactured by means of drying at the said temperature and thus contains a very high content of ginsenoside.

In the drying step, the frozen steamed ginseng may be used as it is in a frozen state or may be used after being thawed. In the present invention, thawing does not mean a complete thawing, but refers to a state in which a surface of the frozen steamed ginseng is melt and the inside thereof is slightly melt, thus maintaining thin ice in tissues therein.

In the present invention, drying may be performed by loading frozen or thawed ginsengs in an overlapping manner, wherein a drying time may be increased or decreased according to an overlapping height or the number of trays put into a dryer. The said overlapping height is not limited. If the steamed ginsengs are excessively loaded, heat is not evenly distributed thereinto, and thus properties of the finally obtained red ginsengs may not be the same as each other. In one Example of the present invention, in case of drying the steamed ginsengs after loading in an overlapping manner, it was identified that there is no change in the properties of the porous red ginsengs according to the present invention. According to such loading in an overlapping manner, it is possible to enhance the productivity of the red ginseng manufactured by means of the manufacturing method according to the present invention, and thus such method may be applicable on an industrial scale.

In the drying step of the present invention, drying may be performed under the vacuum or ambient-pressure condition. Particularly, the vacuum drying may be performed at a temperature of 75° C. to 95° C. under a pressure of 0 to 120 mmHg for 7 hours to 72 hours, preferably for 10 hours to 48 hours, more preferably for 8 hours to 24 hours, by adjusting a temperature of hot water surrounding a vacuum dryer. The said vacuum drying step may be performed in several stages by varying the temperature. For example, such drying may be performed at a temperature of 75° C. to 85° C. for 1 hours to 20 hours, and then a subsequent drying may be performed again at 85° C. to 95° C. for 1 hours to 20 hours by changing a temperature condition, wherein such step of changing the temperature may be performed two to five times. According to one Example of the present invention, the vacuum drying may be performed at a temperature of 85° C., 95° C. and 75° C. respectively for 1 hours to 20 hours while maintaining a pressure at 0 mmHg to 120 mmHg.

The ambient-pressure drying may be performed at an internal temperature of 50° C. to 65° C. for 24 hours to 48 hours.

The method for manufacturing the porous red ginseng according to the present invention may further include a step of cutting ginsengs in a frozen or thawed state before the drying step after finishing the freezing step, and preferably the ginsengs may be cut in a thickness of 1 mm to 10 mm, but not limited thereto. By further including the said cutting step, there is provided the porous red ginseng, which may be immediately eaten without a separate treatment, along with a more excellent crispy mouthfeel and an excellent flavor.

The present invention also provides the red ginseng or slices thereof manufactured by means of the said manufacturing method.

The red ginseng manufactured according to the present invention may be directly eaten as an original form or slices of the red ginseng without an additional process such as an addition of fructose, etc., wherein such red ginseng may have a uniform porosity formed therein, have a crispy mouthfeel and an excellent flavor due to a lower rate of moisture content (particularly 3% or lower), and have an excellent storage stability due to such low moisture content.

Advantageous Effects

The porous red ginseng manufactured by means of the manufacturing method according to the present invention forms a uniform porosity therein and thus obtains a crispy mouthfeel and an excellent flavor without an additional process such as an addition of fructose, etc., such that the resulting red ginseng may be not only directly eaten as an original form or slices of the red ginseng, but also have a very high content of ginsenoside and a low content of moisture therein, thus achieving a very excellent storage quality.

MODE FOR INVENTION

The features and advantages of the present invention as well as methods for achieving the same will be apparent with reference to Examples described in detail hereinafter. However, the present invention is not limited to the Examples disclosed hereinafter, but will be implemented in various different forms as well. However, the following Examples will be suggested for complete disclosure of the present invention and provided only for the purpose of completely illustrating the scope of the present invention to those skilled in the art, and thus the present invention will be defined only by the scope of the claims thereto.

EXAMPLE

Manufacturing of a Porous Red Ginseng According to Various Conditions

To identify whether porosity is formed or not in a red ginseng according to various conditions, the red ginseng having a uniform porosity was manufactured by varying a presence of freezing for a steamed ginseng, a presence of thawing and a drying condition.

Example 1

Freezing and Vacuum-Drying

Ginsengs, which were steamed at 95° C. to 105° C. for two hours and 30 minutes, were slowly and completely frozen at −25° C. to −15° C. for 72 hours, then loaded in a single layer onto a tray, and then put into a vacuum dryer, which was pre-heated at a hot water temperature of 85° C. The resulting ginsengs were dried at the hot water temperature of 85° C. for about three hours and dried at the hot water temperature of 95° C. for about two hours while maintaining a pressure at 0 mmHg to 120 mmHg, and then vacuum-dried at the hot water temperature of 75° C. for about ten hours, such that the dried red ginsengs having a uniform porosity were obtained (the rate of moisture content: 2.1%).

Example 2

Freezing and Vacuum-Drying

Ginsengs, which were steamed at 95° C. to 105° C. for two hours, were slowly and completely frozen at −20° C. to −10° C. for 80 hours, then loaded in a single layer onto the tray, and then put into the vacuum dryer, which was pre-heated at the hot water temperature of 85° C. The frozen steamed ginsengs were dried at the hot water temperature of 85° C. for about eight hours while maintaining the pressure at 0 mmHg to 120 mmHg, and then were vacuum-dried at the hot water temperature of 75° C. for about 13 hours, such that the dried red ginsengs having a uniform porosity were obtained (the rate of moisture content: 1.8%).

Example 3

Thawing and Vacuum-Drying

Ginsengs, which were steamed at 95° C. to 105° C. for two hours, were slowly and completely frozen at −10° C. to −3° C. for five days, then thawed and loaded in a single layer onto the tray, and then put into the vacuum dryer, which was pre-heated at the hot water temperature of 95° C. The thawed steamed ginsengs were dried at the hot water temperature of 85° C. for about three hours and dried at the hot water temperature of 95° C. for about two hours while maintaining the pressure at 0 mmHg to 120 mmHg, and then vacuum-dried at the hot water temperature of 75° C. for 11 hours, such that the dried red ginsengs having a uniform porosity were obtained (the rate of moisture content: 1.6%).

Example 4

Thawing and Vacuum-Drying

Ginsengs, which were steamed at 95° C. to 105° C. for two hours, were slowly and completely frozen at −10° C. to −3° C. for five days, then thawed and loaded in a single layer onto the tray, and then put into the vacuum dryer, which was pre-heated at the hot water temperature of 95° C. The thawed steamed ginsengs were dried at the hot water temperature of 95° C. for about five hours while maintaining the pressure at 0 mmHg to 120 mmHg, and then were vacuum-dried at the hot water temperature of 75° C. for five hours, such that the dried red ginsengs having a uniform porosity were obtained (the rate of moisture content: 1.3%).

Example 5

Freezing and Ambient-Pressure Drying

Ginsengs, which were steamed at 95° C. to 105° C. for two hours and 30 minutes, were slowly and completely frozen at −25° C. to −15° C. for 72 hours, then loaded in a single layer onto the tray, and then put into a general dryer, which was pre-heated at 65° C. The resulting ginsengs were dried at an internal temperature of 50° C. to 65° C. for about 48 hours under an ambient-pressure condition, such that the dried red ginsengs having a uniform porosity were obtained (the rate of moisture content: 2.1%).

Example 6

Thawing, Cutting and Vacuum-Drying

Ginsengs, which were steamed at 95° C. to 105° C. for one hour and 30 minutes, were slowly and completely frozen at −25° C. to −15° C. for 72 hours, then thawed and cut in a thickness of 2 mm to 5 mm, and then put into the vacuum dryer, which was pre-heated at the hot water temperature of 95° C. The slices of the said thawed steamed ginseng were dried at the hot water temperature of 95° C. under the pressure of 0 mmHg to 120 mmHg for about one hour, then vacuum-dried for about five hours by setting the hot water temperature to 85° C., and then vacuum-dried at the hot water temperature of 75° C. for about two hours, such that the slices of the dried red ginseng having a uniform porosity were obtained (the rate of moisture content: 0.5%).

Example 7

Thawing, Vacuum-Drying and Overlapped Loading

To apply the method for manufacturing the porous red ginseng according to the present invention on an industrial scale, the red ginsengs were manufactured by loading in an overlapping manner. Ginsengs, which were steamed at 95° C. to 105° C. for two hours and 30 minutes, were completely frozen at −25° C. to −15° C. for 72 hours, and then thawed and loaded onto the tray in a thickness of about 5 cm in an overlapping manner. The overlapped steamed ginsengs were put into the vacuum dryer, which was pre-heated at the hot water temperature of 95° C., then dried at the hot water temperature of 95° C. under the pressure of 0 mmHg to 120 mmHg for about 18 hours, then vacuum-dried for about six hours by setting the hot water temperature to 85° C., and then vacuum-dried at the hot water temperature of 75° C. for about 16 hours, such that the dried red ginsengs having a uniform porosity were obtained (the rate of moisture content: 1.9%).

Comparative Example 1

Non-Freezing and Vacuum-Drying

Ginsengs, which were steamed at 95° C. to 105° C. for two hours and 30 minutes, were loaded in a single layer onto the tray, and then put into the vacuum dryer, which was pre-heated at the hot water temperature of 85° C. The resulting ginsengs were dried at the hot water temperature of 85° C. for about three hours and dried at the hot water temperature of 95° C. for about two hours while maintaining the pressure at 0 mmHg to 120 mmHg, and then vacuum-dried at the hot water temperature of 75° C. for about 20 hours, such that the dried red ginsengs were obtained (the rate of moisture content: 4.5%).

Comparative Example 2

Manufacturing of a Freeze-Dried Red Ginseng

Freeze-dried red ginsengs were manufactured by means of a process of steaming to freeze-drying. Particularly, ginsengs, which were steamed at 95° C. to 105° C., were freeze-dried at −58° C. to −45° C. for about 72 hours, such that the freeze-dried red ginsengs were obtained (the rate of moisture content: 6.9%).

Comparative Example 3

Manufacturing of a Conventional Dried Red Ginseng

Conventional dried red ginsengs were manufactured by means of a process of steaming to ambient-pressure drying. Particularly, ginsengs, which were steamed at 90° C. to 105° C., were loaded in a single layer and dried at an internal temperature of 50° C. to 65° C. under an ambient pressure condition for about 72 hours, such that the conventional dried red ginsengs were obtained (the rate of moisture content: 16.8%).

Experimental Example 1

Figure 2:
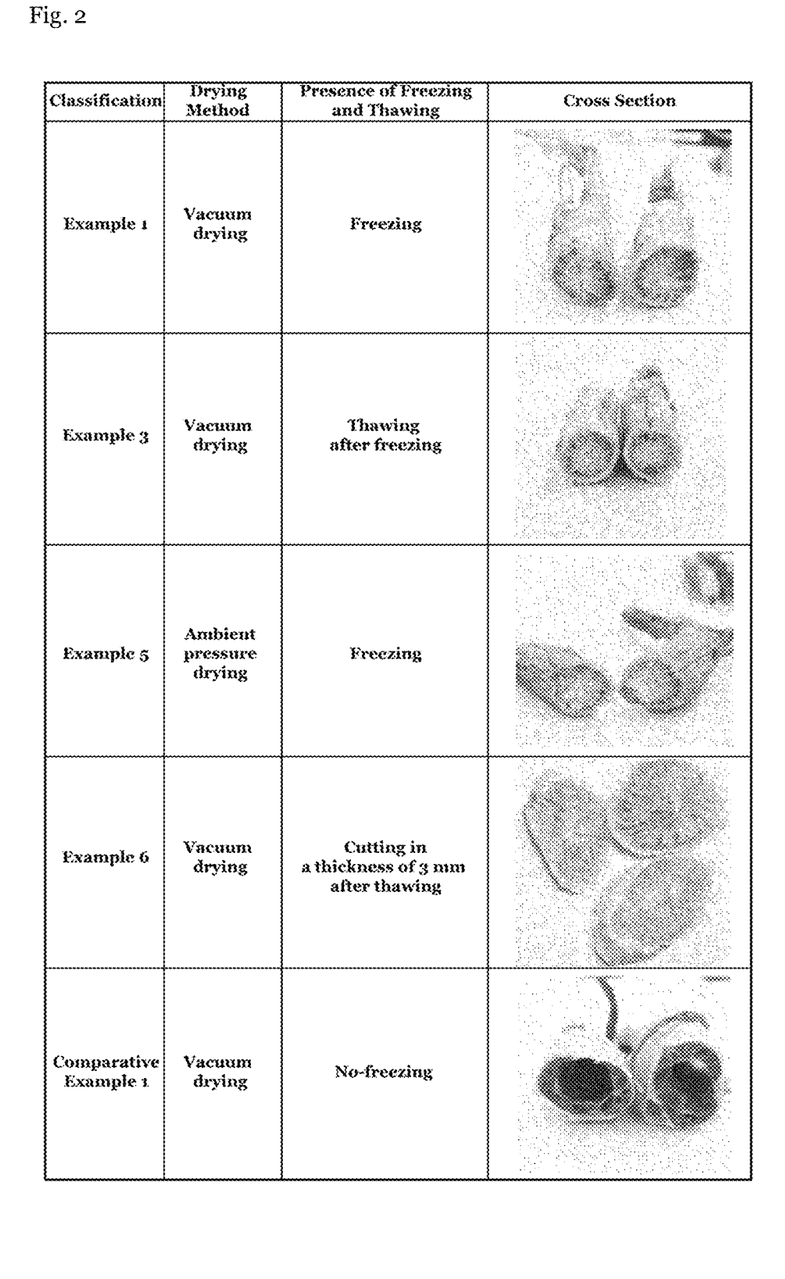
FIG. 2 is an image of showing a cross section of the porous red ginseng manufactured according to Examples of the present invention.
Figure 3:
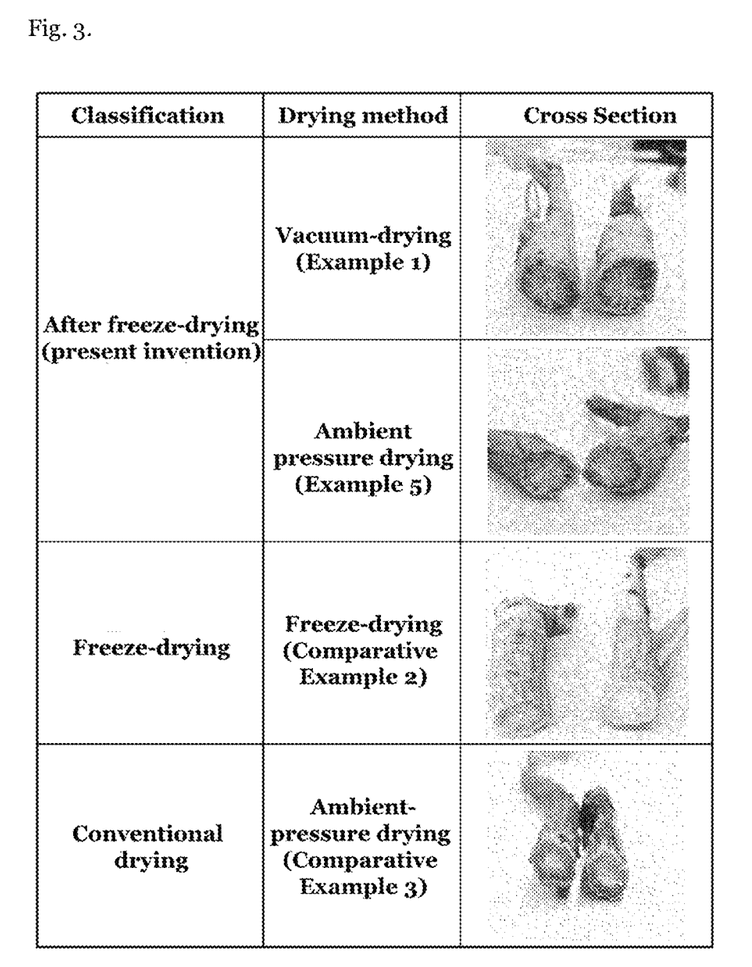
FIG. 3 is an image of showing results from comparing cross sections of the red ginseng manufactured according to freezing and drying conditions.
Figure 4:
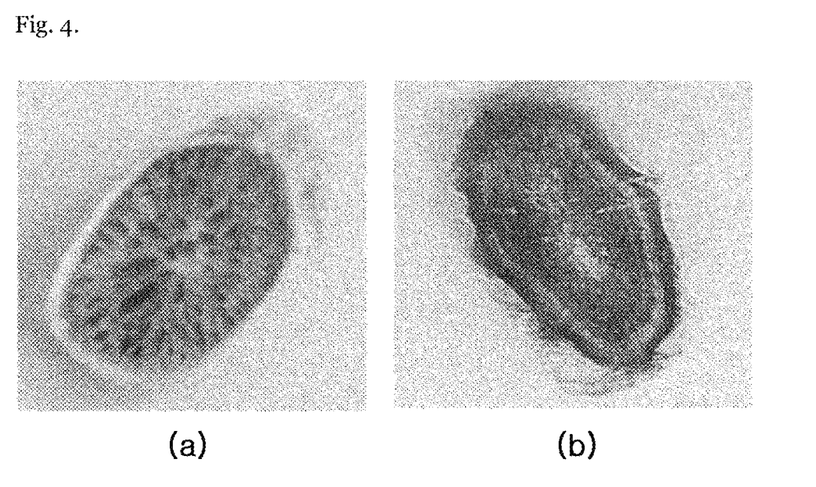
FIG. 4 shows cross sections of (a) a red ginseng slice manufactured according to the present invention and (b) a conventional dried red ginseng slice.

Comparison of Porosity Formation and Texture (Hardness of Tissues) in the Red Ginseng To identify a porosity formation and texture in red ginsengs manufactured according to various conditions, the differences of the porosity formation and texture were compared among the red ginsengs manufactured in Examples and Comparative Examples by varying a presence of freezing for a steamed ginseng, a presence of thawing after freezing, a drying form thereof and a drying method thereof, wherein the results thereof were shown in FIGS. 2 to 4.

Experimental Example 1-1: Identification of the porosity formation according to a presence of freezing To evaluate an effect of the presence of freezing for steamed ginsengs on the porosity formation and texture (hardness of tissues) in the red ginsengs, such porosity formation and texture were identified with regard to the red ginsengs manufactured by means of the methods of Examples 1, 3, 5 and 6, wherein the results thereof were shown in FIG. 2.

In case of vacuum-drying the steamed ginsengs without freezing (Comparative Example 1), it was identified that porosity is not uniformly formed with a large inside cavity formed in the center, and tissues are hard.

It means that a degree of porosity and a hardness of tissues vary even in the same drying method (vacuum-drying). That's seemingly because the steamed ginsengs have ice constantly formed between tissues thereof while being slowly frozen, and then the ice is escaped all at once therefrom in a vapor state under the vacuum-drying condition, such that dried red ginsengs show uniform porous tissues and a hardness of tissues is decreased. Also, it was identified that the porosity is uniformly formed even in the red ginsengs, for which the frozen steamed ginsengs are processed under the ambient-pressure drying condition (Example 5).

Experimental Example 1-2

Identification of the Porosity Formation According to a Presence of Thawing To evaluate an effect of the presence of thawing for completely frozen steamed ginsengs on the porosity formation and texture in the red ginsengs, a comparison was made among the red ginsengs manufactured by means of the methods of Examples 1, 3 and 5.

The results thereof were shown in FIG. 2. In case of being completely frozen in a first stage, it was identified that the porosity is uniformly formed regardless of the presence of thawing when the frozen steamed ginsengs are dried under the vacuum or ambient-pressure drying condition.

Experimental Example 1-3

Identification of the Porosity Formation According to a Drying Form

To evaluate an effect of the drying form of frozen steamed ginsengs on the porosity formation and texture in the red ginsengs, the frozen steamed ginsengs were thawed, and then cut in a thickness of 2 mm to 5 mm to identity whether the porosity is formed or not therein (Example 6).

The results thereof were shown in FIG. 2. When the frozen steamed ginsengs are thawed, then cut in a certain thickness, and then vacuum-dried under the set condition, it was found that the porosity is more uniformly formed than in the case of being vacuum-dried in an original form thereof, and there is no significant difference in texture.

Experimental Example 1-4

Identification of the Porosity Formation According to a Loading Method

To identify if the method for manufacturing the porous red ginseng according to the present invention may be applicable on an industrial scale, the porous red ginseng manufactured by means of overlapped loading in Example 7 was compared with the red ginseng manufactured by means of loading in a single layer (Examples 3 and 4).

As a result, in case of loading the frozen steamed ginsengs onto a large amount of trays in overlapping manner and drying those ginsengs, it was found that a relatively large amount of vapor was generated from the frozen steamed ginsengs. Thus, under a correspondingly set temperature condition, a drying time was increased about 20 hours more than in the case of loading in a single layer, but there is no significant difference in the porosity formation, flavor and crispy texture of the red ginseng.

Accordingly, in case of processing the red ginseng of the present invention on an industrial scale, it was identified that the drying time may be increased or decreased depending on the method for loading the frozen steamed ginsengs onto the tray and the number of trays put into the dryer.

Experimental Example 1-5

Identification of the Porosity Formation According to a Drying Method

To compare a difference of the porosity formation and texture between the red ginseng manufactured by means of the inventive method for manufacturing the red ginseng and the red ginseng processed by means of other drying methods, a comparison was made among Examples 1 and 5 as well as Comparative Examples 2 and 3, wherein the results thereof were shown in FIG. 3.

As shown in FIG. 3, in case of the red ginseng manufactured by means of the method of the present invention, it was identified that the porosity is uniformly formed and thus tissues are not hard, but crispy.

However, in case of the red ginseng processed by means of the freeze-drying method (Comparative Example 2), it was identified that the steamed ginseng itself has very small pores, which correspond to an original form of tissues that the steamed ginseng has rather than ones newly formed during a processing process. Also, in case of the red ginseng processed by means of the freeze-drying method, it was identified that tissues thereof are neither hard nor crispy, but crumbly. It suggests that the steamed ginseng must not be quick-frozen, but be slowly frozen to form a certain size of ice between tissues such that the red ginseng may obtain the porosity formation and crispy texture.

Also, in case of the red ginseng dried by means of a conventional drying method, that is, drying under the ambient-pressure condition, without freezing the steamed ginseng (Comparative Example 3), it was identified that tissues thereof are too hard to eat directly. On contrary, in case of the red ginseng manufactured by means of the method of the present invention, it was identified that such red ginseng has the porosity uniformly formed, and thus has relatively soft tissues compared to the conventional red ginseng.

More particularly, as a result of comparing cross sections of respective red ginseng slices in order to make a comparison with the red ginseng of the conventional drying method (FIG. 4), it was identified that the red ginseng slice manufactured by means of the method of the present invention (Example 5, FIG. 4A) has the porosity more uniformly formed than the conventional dried red ginseng slice (Comparative Example 3, FIG. 4B), such that the former has a lower density of tissues and a relatively larger surface area than the latter, and the conventional dried red ginseng slice has a dense cross section without the porosity. In case of manufacturing a concentrate in an industrial aspect by using the porous red ginseng processed by means of the method of the present invention, it is expected that the inventive porous red ginseng may be easier to extract with a higher extraction yield due to a large surface area, compared to in the case of manufacturing the concentrate with the conventional red ginseng.

Thus, when comparing sensory qualities such as the porosity formation, texture and the like with regard to the red ginseng obtained by freezing the steamed ginseng and drying the resulting ginseng under the same ambient-pressure condition by means of the method of the present invention (Example 5), it was identified that the freezing of the steamed ginseng is an important factor in giving the porosity formation and crispy texture to the red ginseng.

To summarize the content described above, it was identified that it is essential to perform a process of freezing the steamed ginseng at a certain temperature and for a certain time and it is also necessary to thaw the frozen steamed ginseng as it is in a frozen state or in a state of maintaining thin ice inside the frozen ginseng and then drying the resulting ginseng under vacuum or at an ambient pressure before use, such that the porous red ginseng may be manufactured with improvement in a hardness of tissues according to the present invention. Also, in case of using the steamed ginseng, which was slowly and completely frozen regardless of the presence of thawing (Experimental Example 1-2), drying form (Experimental Example 1-3) and loading method (Experimental Example 1-4), it was identified through the present Examples that the red ginseng may be processed with improvement in the porosity formation and texture.

Experimental Example 2

Measurement of a Moisture Content Rate of the Porous Red Ginseng

To identify a rate of moisture content in the red ginseng manufactured by means of the method of the present invention, the rate of moisture content in the red ginseng was measured by using a halogen moisture analyzer (HG6$_3$-P, Mettler).

About 3 g of each red ginseng specimen, manufactured by means of the methods in Examples and Comparative Examples, was put into the moisture analyzer, and then measured at 108° C. for 140 seconds, after which such measurement was automatically finished, if a change in the weight of the specimen was 1 mg or less.

As a result, in case of the red ginsengs processed by means of the method of the present invention (Examples 1 to 7), it was identified that a moisture content thereof is maintained at 3% or less. On the other hand, considering that the moisture content of the red ginseng processed by means of the traditional method was 15% to 20% on average and the red ginseng manufactured by means of freeze-drying in Comparative Example 2 has the moisture content of 6% or more, it can be seen that the red ginseng processed by means of the inventive method shows an excellent storage quality because such red ginseng has a very low risk of deterioration caused by moisture even when being stored for a long period of time.

Experimental Example 3 Sensory Evaluation

Experimental Example 3-1

Sensory Evaluation According to the Manufacturing Method

To compare a sensory difference among the red ginseng manufactured by means of the method of the present invention, the freeze-dried one (Comparative Example 2) and the conventional dried one (Comparative Example 3), an evaluation on respective properties and overall preferences was performed for those ginsengs. A panel of 15 persons was collected only from those who received an education on sensory evaluation, and was provided specimens, which were marked with random sampling numbers, respectively. From the results of the sensory test, an average and a standard deviation were calculated by using the PASWS statistics 18 program, after which one-way ANOVA was performed, then Duncan's post-hoc test was carried out, and then a confidence level was taken as 95% ($p<0.05$).

Evaluation Items

A preference was evaluated according to evaluation items of appearance, color impression, red ginseng flavor, masticatory feel, crispiness, sweet taste, red ginseng taste, bitter taste and after taste, using a seven-point scoring test, ranging from 7 points for very good to 1 point for very bad. Also, an overall preference was evaluated according to the seven-point scoring test, ranging from 7 points for very good to 1 point for very bad.

Evaluation Results

The results of the sensory evaluation performed according to the preference and evaluation items are as shown in a following table 1.

TABLE 1

| | Properties | Conventional dried red ginseng | Freeze-dried red ginseng slice | Inventive red ginseng slice |
| --- | --- | --- | --- | --- |
| PREFERENCE | Appearance | 4.80 ± 1.21 | 4.40 ± 1.18 | 3.67 ± 1.40 |
| | Color impression | 4.33 ± 1.45 | 4.00 ± 1.60 | 3.93 ± 1.03 |
| | Red ginseng | 4.40 ± 0.99 | 4.27 ± 0.96 | 4.80 ± 0.86 |

TABLE 1-continued

| Properties | Conventional dried red ginseng | Freeze-dried red ginseng slice | Inventive red ginseng slice |
| --- | --- | --- | --- |
| flavor | | | |
| Masticatory feel | 2.27 ± 1.33 | 5.00 ± 1.25 | 5.47 ± 1.19 |
| Crispiness | 2.60 ± 1.30 | 5.07 ± 1.03 | 5.60 ± 1.30 |
| Sweet taste | 4.47 ± 0.92 | 4.60 ± 1.06 | 4.60 ± 1.30 |
| Red ginseng taste | 4.80 ± 1.08 | 4.27 ± 1.22 | 4.93 ± 1.28 |
| Bitter taste | 4.40 ± 0.83 | 4.27 ± 1.22 | 4.40 ± 1.18 |
| After tast | 4.13 ± 1.36 | 4.27 ± 0.88 | 4.13 ± 1.55 |
| Overall preference | 3.53 ± 1.41 | 4.40 ± 1.30 | 5.00 ± 1.20 |

When taking Table 1 above into consideration, the overall preference for the conventional dried red ginseng slice was evaluated as "slightly bad" with 3.53 points, while overall preferences for the freeze-dried red ginseng slice and the red ginseng slice manufactured by means of the method of the present invention were evaluated as "slightly good" with 4.40 points and 5.5 points, respectively. For a significant probability, it is shown that there is a difference among the three products.

Figure 5:
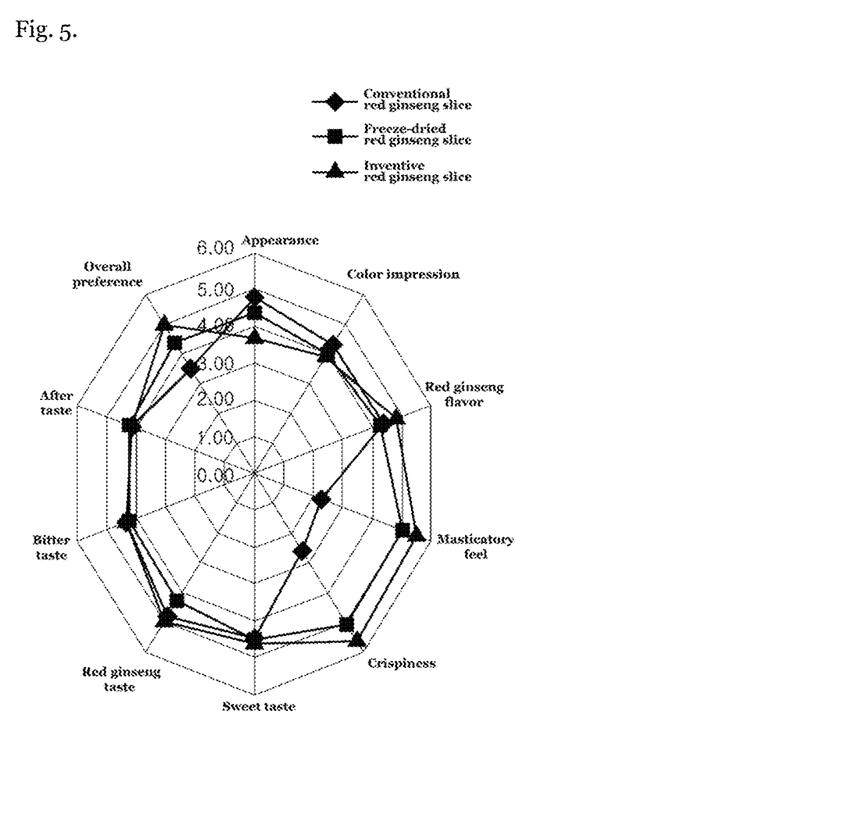
FIG. 5 is a graph of showing results from comparing sensory evaluations of the porous red ginseng according to a difference of manufacturing methods.

As shown in FIG. 5, the preference for the conventional dried red ginseng slice was higher than the preference for the product manufactured by means of the method of the present invention in terms of appearance and color impression, but was evaluated as "bad" in terms of masticatory feel and crispiness. The preference for the freeze-dried red ginseng slice was higher than the preference for the conventional dried red ginseng slice in terms of masticatory feel, crispiness and sweet taste, but was lower in terms of red ginseng taste and bitter taste. The preference for the red ginseng slice of the present invention was lower than the preference for the conventional dried red ginseng slice in terms of appearance and color impression, but was higher with a significant difference in terms of masticatory feel and crispiness. In other words, unlike the conventional dried red ginseng slice, it can be seen that the red ginseng slice of the present invention may be easily eaten directly without an additional separate process.

Experimental Example 3-2

Sensory Evaluation According to a Porosity Difference

Figure 6:
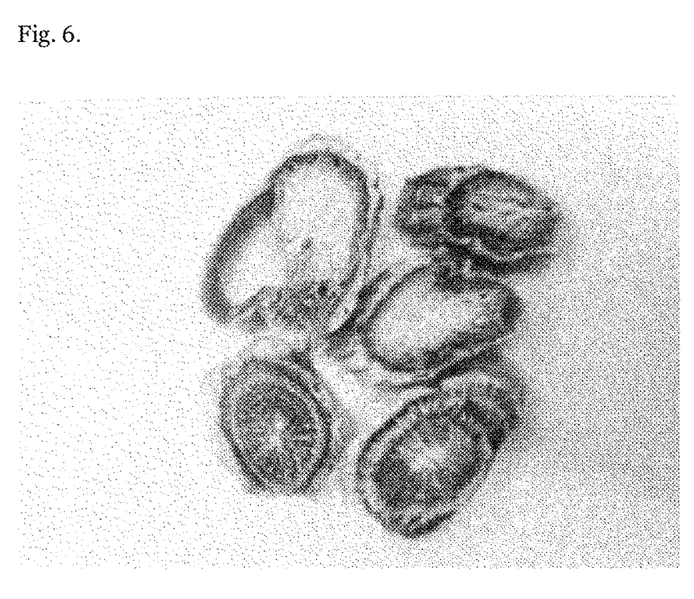
FIG. 6 is an image of showing a cross section of the red ginseng, in which porosity is not uniformly formed.

The sensory evaluation was performed on mouthfeel with regard to the red ginseng with a uniform porosity, manufactured by means of the method of the present invention (Example 6) and the red ginseng without a uniform porosity formed (Example 1 and FIG. 6 of the Korean Public Patent Notification No. 10-2013-0049649). A panel of 10 persons aged between twenties and fifties was collected only from those who received an education on sensory evaluation, and was provided specimens, which were marked with identification numbers, respectively. The results of the sensory test were indicated as an average thereof.

Test Specimen

The slices, obtained by cutting the taproots of the red ginsengs manufactured by means of the present invention above and the comparative invention respectively at an angle of 25° to 30° and in the thickness of 2 mm to 3 mm, were used and identified respectively as VDRGW (present invention) and VDRGT (control group), wherein five slices were provided to each member of the panel.

Evaluation Items

Mouthfeel was evaluated according to evaluation items of masticatory degree and crispiness, using the seven-point scoring test, wherein the masticatory degree ranged from 7 points for "very difficult" to 1 point for "very easy." Also, the evaluation item of crispiness ranged from 7 points for "very hard" to 1 point for "very crispy."

Evaluation Results

The results of the sensor evaluation performed according to the evaluation items on mouthfeel are as shown in a following table 2.

TABLE 2

|  | Properties | VDRGW | VDRGT |
|---|---|---|---|
| Preference | Masticatory degree | 2.7 | 5.4 |
|  | Crispiness | 2.3 | 5.6 |

When taking Table 2 above into consideration, in case of the red ginseng having a uniform porosity according to the present invention (identification no.: VDRGW), it was identified that a masticatory degree was 2.7 points on average and crispiness was 2.3 points on average, such that such red ginseng is easy to masticate and is crispy, thus showing an excellent mouthfeel. On the other hand, in case of the control group of the red ginseng without a uniform porosity formed (identification no.: VDRGT), it was identified that the masticatory degree and crispiness were 5.4 points and 5.6 points, respectively, such that such red ginseng is difficult to masticate and is also hard, thus showing a bad mouthfeel.

Thus, it was identified that the red ginseng having a uniform porosity manufactured by means of the method of the present invention is crispier and is easier to masticate than the control group of the red ginseng without having a uniform porosity formed therein, thus showing an excellent mouthfeel.

Experimental Example 4

Analysis of Active Components

To identify a difference of active components of the red ginseng according to a drying method, 11 species of active component ginsenoside (Ginsenoside $Rg_1$, Re, Rf, $Rg_2$, $Rh_1$, $Rb_1$, Rc, $Rb_2$, $Rb_3$, Rd, $Rg_3$ and $Rh_2$) were analyzed with regard to the red ginseng powder manufactured by means of the method of the present invention and the conventional red ginseng powder according to "4. Health Functional Food Testing Method and 3. Testing Method for Each Component: 3-55 Ginsenoside in the full text of the Notification of Criteria and Specification for Health Functional Food (No. 2013-186 on Jun. 5, 2013)," wherein the results thereof are as shown in a following table 3.

TABLE 3

| Specimen name | Conventional dried red ginseng | Inventive red ginseng |
|---|---|---|
| Weight | 2.0701 g | 2.0811 g |
| Ginsenoside Rg1 | 2.26 | 2.00 |
| Ginsenoside Re | 2.67 | 3.28 |
| Ginsenoside Rf | 1.08 | 1.22 |
| Ginsenoside Rg2 | 0.62 | 1.26 |
| Ginsenoside Rh1 | 1.13 | 1.64 |
| Ginsenoside Rb1 | 2.71 | 2.84 |
| Ginsenoside Rc | 1.77 | 2.17 |
| Ginsenoside Rb2 | 2.28 | 3.02 |
| Ginsenoside Rb3 | 0.22 | 0.43 |
| Ginsenoside Rd | 0.62 | 1.49 |
| Ginsenoside Rg3 | 1.12 | 2.79 |
| Ginsenoside Rh2 | 0.00 | 0.00 |
| Rg1 + Rb1 + Rg3 | 6.09 | 7.63 |

When taking Table 3 above into consideration, it was identified that the red ginseng powder of the present invention has a slightly higher content of most ginsenosides. In particular, as a result of comparing total contents of ginsenosides $Rb_1$, $Rg_1$ and $Rg_3$, i.e., the main index components in the content of the red ginseng, classified as a health functional food by the Ministry of Food and Drug Safety, it was identified that the conventional dried red ginseng has a total content of 6.09 mg/g and the red ginseng of the present invention has a total content of 7.63 mg/g, thus suggesting that the red ginseng of the present invention has a higher content.

Also, in case of ginsenoside $Rg_3$ contained as an index component in the red ginseng unlike the ginseng, it was identified that the content thereof was 1.12 mg/g in the conventional dried red ginseng and 2.79 mg/g in the red ginseng of the present invention, thus suggesting that such content in the red ginseng of the present invention is at least twice more than the content in the conventional dried red ginseng. In other words, it was identified that the red ginseng manufactured by means of the method of the present invention has a significantly higher content of the active component ginsenosides compared to the conventional dried red ginseng manufactured by means of a traditional method.

The invention claimed is:

1. A method for manufacturing a porous red ginseng, wherein the method comprises:
   (a) steaming a fresh ginseng by using water at a temperature of 95° C. to 105° C. or steam at a temperature of 95° C. to 105° C. for 90 minutes to 150 minutes;
   (b) freezing the ginseng obtained in step (a) at −25° C. to −3° C. for 72 hours to 120 hours;
   (c) optionally, thawing the ginseng obtained in step (b) to a state where ice is kept inside the ginseng; and
   (d) vacuum-drying the ginseng obtained in step (b) or (c) at 75° C. to 95° C. for 10 hours to 48 hours by adjusting the temperature of water surrounding a vacuum dryer or ambient-pressure drying the ginseng obtained in step (b) or (c) at 50° C. to 65° C. for 24 hours to 48 hours by adjusting the internal air temperature of a dryer to obtain a porous red ginseng.

2. The method of claim 1, wherein the vacuum-drying is performed in one or more stages by varying a temperature of water surrounding the vacuum dryer.

3. The method of claim 1, wherein the vacuum-drying is performed at 75° C. to 85° C. for 10 hours to 20 hours, and then the vacuum-drying is performed again at 85° C. to 95° C. for 1 hour to 20 hours.

4. The method of claim 1, wherein the vacuum-drying is performed under the pressure at 0 mmHg to 120 mmHg.

5. The method of claim 1, wherein the method further comprises a step of cutting the ginseng obtained from step (b) or (c) above in a thickness of 1 mm to 10 mm before step (d).

6. The method of claim 1, wherein the manufactured porous red ginseng has a moisture content of 3 wt % or less.

\* \* \* \* \*